(12) United States Patent
Raasakka

(10) Patent No.: US 7,000,981 B2
(45) Date of Patent: Feb. 21, 2006

(54) COLLAPSIBLE WIND DEFLECTOR FOR A VEHICLE ROOF

(75) Inventor: John Paul Raasakka, Howell, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/837,283

(22) Filed: Apr. 30, 2004

(65) Prior Publication Data

US 2005/0242629 A1 Nov. 3, 2005

(51) Int. Cl.
*B60J 7/22* (2006.01)
(52) U.S. Cl. .................................................. 296/217
(58) Field of Classification Search ................. 296/217
See application file for complete search history.

(56) References Cited

U.S. PATENT DOCUMENTS 4,142,759 A * 3/1979 Bienert ........................ 296/217
6,834,914 B1 * 12/2004 Bohm et al. .................. 296/217

* cited by examiner

*Primary Examiner*—Dennis H. Pedder
(74) *Attorney, Agent, or Firm*—Carlson, Gaskey & Olds

(57) ABSTRACT

A collapsible wind deflector includes two arms that rotate generally toward each other. When a panel on a vehicle roof is in an open position, resilient members fixed about pivot axes in each arm biases the arms to stand vertically in a deployed position with respect to the vehicle roof. A web attached to the arms is held taut to deflect wind away from a roof opening. When the panel is moved to a closed position, a ram on each side of the panel pushes against a corresponding cam feature of the wind deflector, causing each cam feature to push each arm against the biasing force of its corresponding resilient member, and force each arm to rotate inward toward the other arm, collapsing the web.

19 Claims, 3 Drawing Sheets

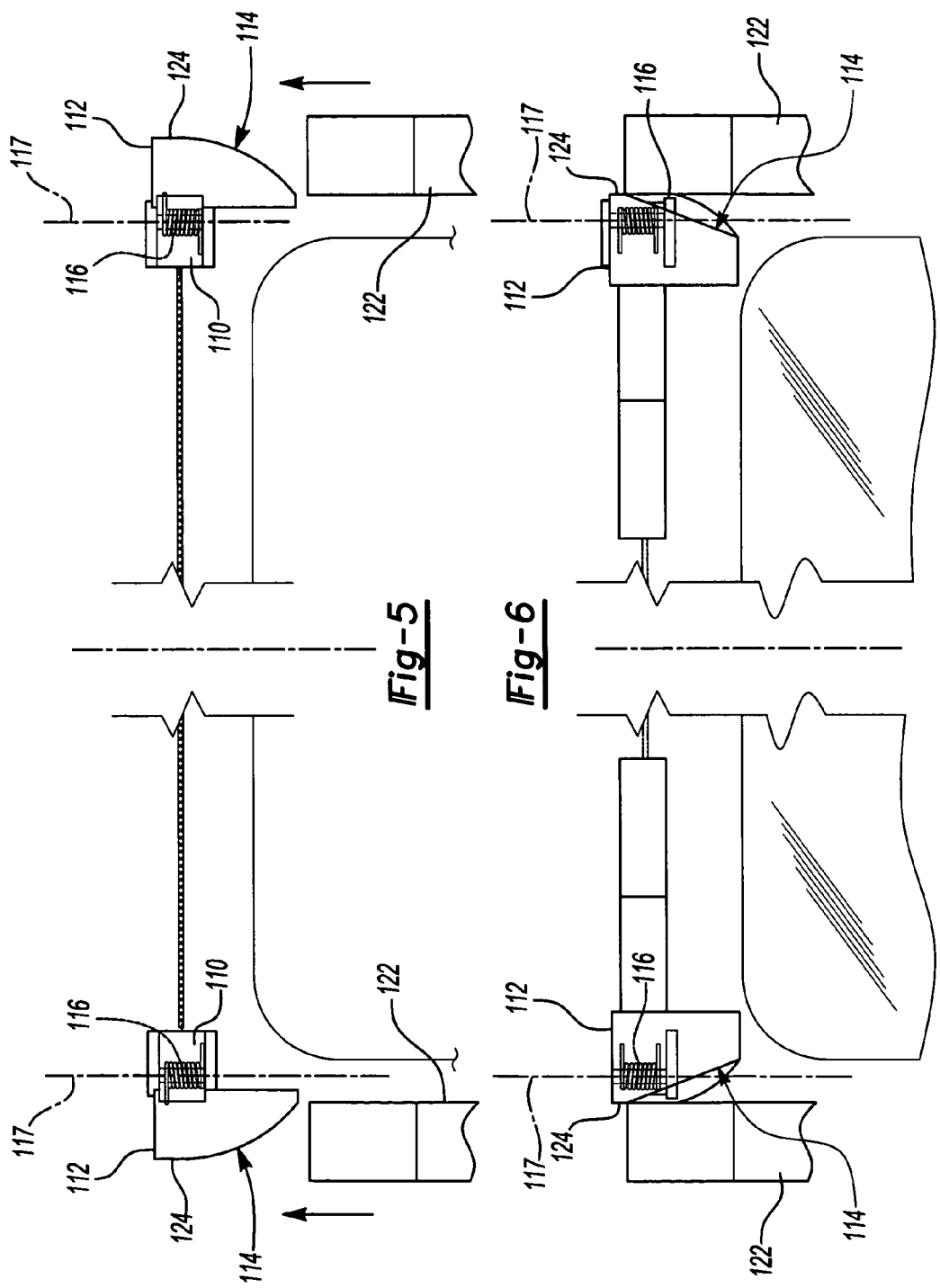

COLLAPSIBLE WIND DEFLECTOR FOR A VEHICLE ROOF

TECHNICAL FIELD

The present invention relates to wind deflectors for vehicle roofs, and more particularly to collapsible wind deflectors.

BACKGROUND OF THE INVENTION

Wind deflectors are often used in conjunction with sunroofs in vehicles to direct air away from a roof opening and prevent excessive air turbulence from occurring within a vehicle passenger compartment. Currently known wind deflectors include arms that run parallel to guide rails of the sunroof. During operation, the arms on the wind deflector rotate about fixed pivot points so that they extend above the vehicle roof. The arms are oriented in a direction generally parallel to the guide rails. A flexible web, such as mesh or fabric, is connected to each arm so that each web stretches alongside each guide rail when the arms are lifted, directing wind away from the roof opening.

Although the pivoting action of the wind deflector arms does manage to lift the web above the vehicle roof, the long length of each arm and the location of the pivot points on the guide rails make it difficult to raise the web high enough to effectively deflect wind. Increasing the height of the wind deflector requires increasing the length of the arms and/or increasing the amount of material used for the web. However, the angled configuration of the wind deflector requires the length of each arm to be increased to a much greater degree than the desired change in height of the web, making height adjustments impractical. Moreover, many sunroof systems have limited packaging space, making it impossible to increase the size of the wind deflector in any case.

There is a desire for a wind deflector that can fit into limited packaging spaces while still being able to extend high enough to effectively deflect wind away from the roof opening.

SUMMARY OF THE INVENTION

The present invention is directed to a collapsible wind deflector that extends high enough to effectively deflect wind away from a roof opening while still being compact enough when folded to fit into a small packaging space. The wind deflector includes two arms that are rotatable substantially toward each other and at an angle with respect to guide rails of a sunroof. When a panel on the vehicle roof is in the open position, a resilient member fixed about a pivot axis for each arm biases the arms to rotate away from each other and stand in the raised or deployed position, generally vertically with respect to a plane of the roof. When the arms are in the raised position, a web attached to each of the arms is held taut by the biasing force in each resilient member to deflect wind away from the roof opening.

When the panel is moved toward a closed position, covering the vehicle roof opening, a ram on each side of the panel pushes against a contact portion of a corresponding cam feature of each arm of the wind deflector. As the panel continues to move toward the closed position, the rams move along the contact portions, causing the cam features to push the arms against the spring biasing force of the resilient members. The arms therefore rotate inward toward each other in a direction generally at an angle (e.g., perpendicular) to the guide rails. As the arms rotate inward toward each other, the web collapses. When the panel is fully closed, the rams maintain contact with the contact portions of the cam features to hold the arms in place against the biasing force of the resilient members.

Because the arms rotate generally toward each other rather than parallel to the guide rails, the height of the wind deflector can be easily increased with a minimal increase in the length of the arms. Thus, the invention provides a compact configuration that can fit into limited sunroof packaging spaces.

BRIEF DESCRIPTION OF THE DRAWINGS

FIG. 5 is a plan view of portions of the wind deflector in an open position; and FIG. 6 is a plan view of portions of the wind deflector in a closed position.

DETAILED DESCRIPTION OF THE EMBODIMENTS

Figure 1:
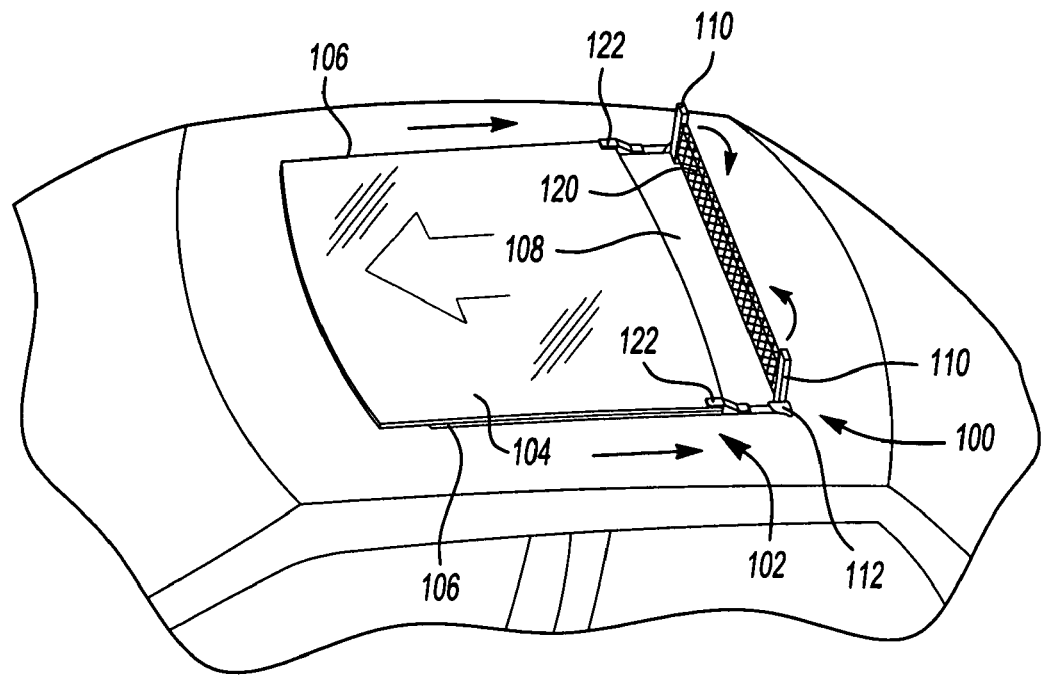
FIG. 1 is a perspective view of a vehicle roof having a wind deflector according to one embodiment of the invention in a deployed position.
Figure 2:
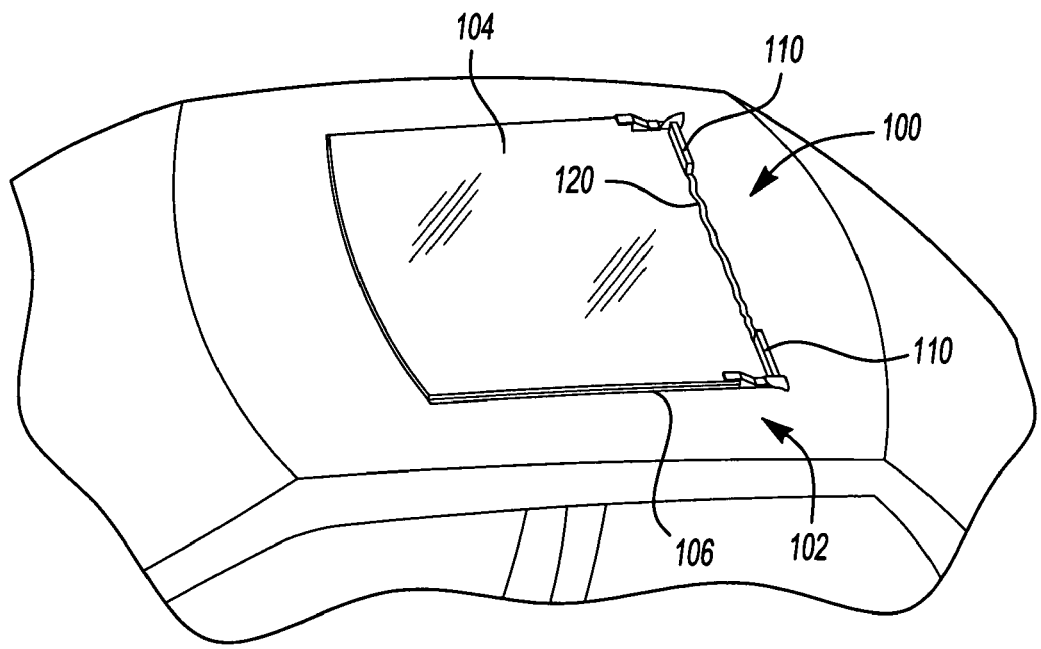
FIG. 2 is a perspective view of the wind deflector of FIG. 1 in a folded position.

FIGS. 1 and 2 show a wind deflector 100 on a vehicle roof 102 according to one embodiment of the invention. The wind deflector 100 may be included as part of a vehicle sunroof assembly having a panel 104, such as a glass panel, that can be moved along a pair of guide rails 106 to open and close a vehicle roof opening 108. When the panel 104 opens the vehicle roof opening 108, the wind deflector 100 moves to a deployed position to deflect wind. When the panel 104 closes the vehicle roof opening 108, the wind deflector 100 folds into a collapsed position.

Figure 3:
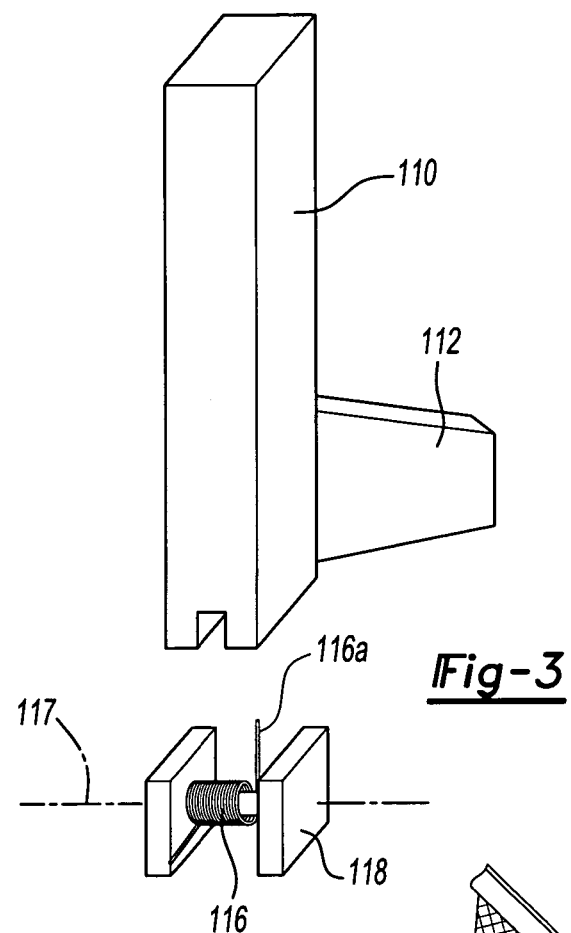
FIG. 3 is an exploded view of a portion of the wind deflector.

As shown in FIGS. 1 through 6, the wind deflector 100 has two arms 110 that are each connected to a cam feature 112 with a contact surface 114. The contact surface 114 can have any surface profile, such as a curved surface profile, that will give the wind deflector desired operating characteristics. Each arm 110 is biased by a resilient member 116 to pivot about a pivot axis 117 into the deployed position, where the arm 110 extends substantially vertically from a plane of the vehicle roof 102 (FIGS. 3, 5 and 6). An example of the connection between the resilient member 116 and the arm 110 is shown in FIG. 3. In the illustrated embodiment, the resilient member 116 is a helical spring wrapped around a support 118 having a portion that acts as the pivot axis 117 of the arm 110. The resilient member 116 includes an extension 116a that is attached to the arm 110 to couple the arm 110 to the resilient member 116 (FIG. 3). The resilient member 116 may have other configurations, such as a leaf spring configuration, without departing from the scope of the invention. The support 118 can be any structure that is compatible with the wind deflector 100 and that is attachable to the vehicle roof 102.

A web 120 is attached between the two arms 110 and is held taut when the arms 110 are in the deployed position. The web 120 itself can be made of any flexible planar material, such as fabric, mesh, plastic sheet, etc. The length of each arm 110 and the dimensions of the web 120 can vary depending on the desired height of the wind deflector 100.

Note that because the arms 110 are designed to rotate toward each other at an angle (e.g., perpendicular) with respect to the guide rails 106, there can be a nearly one-to-one correspondence between any change in the length of the arms 110 and the height of the wind deflector 100 when the wind deflector 100 is deployed.

Figure 4:
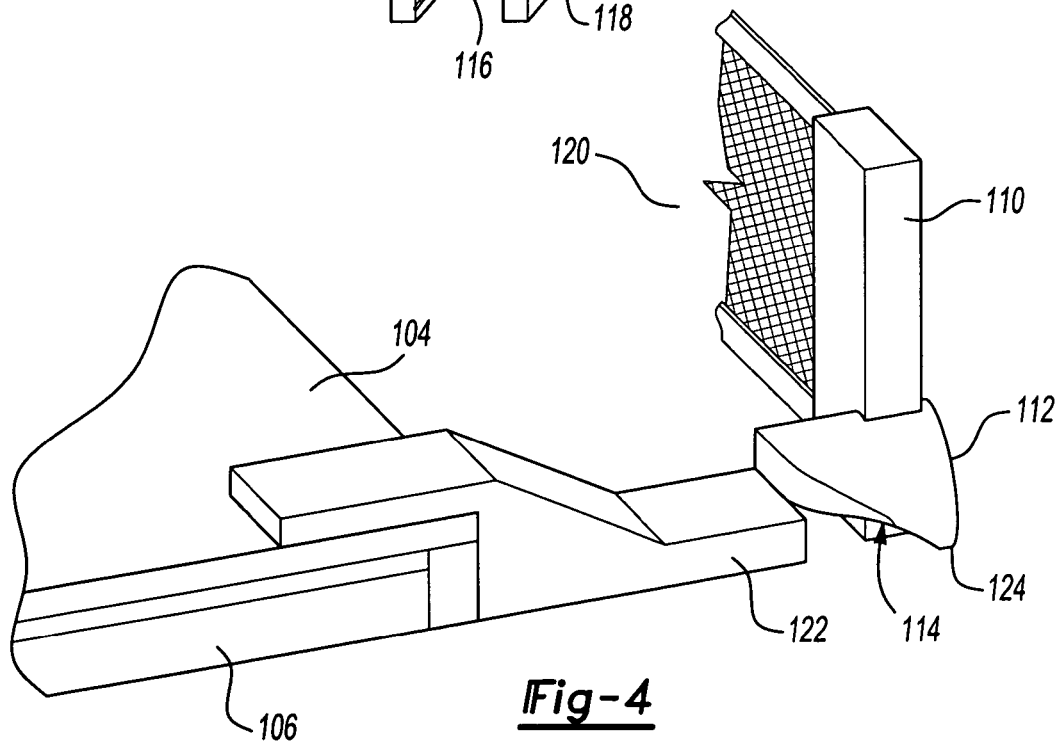
FIG. 4 is a close-up perspective view of a portion of the wind deflector.

The panel 104 has rams 122 extending from each side of the panel 104 and substantially aligned with the guide rails 106 (FIGS. 1, 2 and 4). When the panel 104 is in an open position, the rams 122 do not contact any portion of the wind deflector 100 (FIG. 5), allowing the resilient member 116 associated with each arm 110 to bias the arm 110 to the upright, deployed position. The web 120 stretched between the arms 110 in this position can then deflect wind away from the vehicle roof opening 108. The arms 110 remain in the upright position as long as the panel 104 is open.

When the panel 104 is moved from the open position to the closed position, each ram 122 moves toward a corresponding cam feature 112 and contacts the contact surface 114. The contact surface 114 itself has a curved shape, such as a helical or other appropriate shape, so that continued linear movement of the ram 122 as the panel 104 is closed will cause the cam feature 112 to rotate inward against the biasing force of the resilient member 116. The rotation of the cam feature 112 will in turn cause each arm 110 to rotate inward toward the other arm 110 at an angle with respect to the guide rails 106. In one embodiment, the arms 110 rotate inward directly toward each other so that they rotate substantially perpendicularly to the guide rails 106 (FIGS. 2 and 6). As the arms 110 rotate inward toward each other, the web 120 between the arms 110 collapses and folds into a compact configuration. When the panel 104 is in the completely closed position, the ram 122 pushes against a far end 124 of the contact surface 114 such that the arms 110 rotate completely downward into the collapsed position.

As long as the panel 104 remains closed, the ram 122 will continue to hold the far end 124 of the contact surface 114 against the biasing force of the resilient member 116. The arms 110 will remain held downward to keep the wind deflector 100 in the collapsed position. When the panel 104 is moved to the open position, the ram 122 travels along the contact surface 114 to gradually allow the biasing force of each resilient member 116 to rotate the arms 110 back to the upright deployed position.

Note that if the panel 104 is moved by a motor, the speed at which the panel 104 moves tends to be constant for a particular motor. However, the speed at which the arms 110 are raised or lowered can be varied by changing the shape of the contact surface 114 of the cam feature 112. Those of ordinary skill in the art can see from the figures that the curvature angle of the contact surface 114 can be made shallower or steeper to provide a slower or quicker response of the wind deflector 100 when the ram 122 contacts the contact surface 114.

By configuring the wind deflector so that the arms rotate inward toward each other rather than parallel to the guide rails, the invention provides a wind deflector having sufficient height to deflect wind effectively while still keeping the overall structure of the wind deflector itself compact. Arranging the arms to rotate inward substantially perpendicular to the guide rails minimizes the length of the arms for a given desired deflector height, optimizing the use of limited sunroof system space. Moreover, the height of the deflector can be easily increased by increasing the length of the arms to a similar degree as the desired increased height.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A wind deflector for a vehicle roof, comprising:
    a first arm that is rotatable about a first pivot axis and a second arm that is rotatable about a second pivot axis;
    a web suspended between the first arm and the second arm;
    first and second resilient members, each providing a biasing force that biases the first and second arms, respectively, to rotate to one of a collapsed position and an upright position wherein the first and second arms are rotatable directly toward each other;
    a first cam feature coupled to the first arm and having a first contact surface, and a second cam feature coupled to the second arm and having a second contact surface; and
    first and second rams that are each movable to a position where the first ram pushes against the first contact surface and the second ram pushes against the second contact surface to rotate the first and second arms, respectively, about the first and second pivot axes to the other of the collapsed position and the upright position.

2. The wind deflector of claim 1, wherein the first and second arms are biased by the first and second resilient members, respectively, to rotate to the upright position.

3. The wind deflector of claim 1, wherein the first and second contact surfaces are curved contact surfaces.

4. The wind deflector of claim 1, wherein the first and second rams are attachable to a movable panel.

5. The wind deflector of claim 1, wherein the web is made of a material selected from the group consisting of fabric, mesh, and plastic sheet.

6. A vehicle sunroof system, comprising:
    first and second guide rails;
    a panel movable along the first and second guide rails between an open position and a closed position;
    first and second rams attached to the panel;
    a first arm that is rotatable about a first pivot axis and a second arm that is rotatable about a second pivot axis;
    a web suspended between the first arm and the second arm;
    first and second resilient members, each having a biasing force that biases the first and second arms, respectively, to rotate to one of a collapsed position and an upright position wherein the first and second arms are rotatable directly toward each other and are substantially perpendicular to the first and second guide rails; and
    a first cam feature coupled to the first arm and having a first contact surface, and a second cam feature coupled to the second arm and having a second contact surface, wherein the first ram pushes against the first contact surface and the second ram pushes against the second contact surface to rotate the first and second arms, respectively, about the first and second pivot axes to the other of the collapsed position and the upright position when the panel is moved.

7. The system of claim 6 wherein the first and second arms are biased by the first and second resilient members, respectively, to rotate to the upright position.

8. The system of claim 6 wherein the first and second rams move substantially parallel to the first and second guide rails, respectively.

9. The system of claim 6 wherein the first and second contact surfaces are curved.

10. The system of claim 6 wherein the web is made of a material selected from the group consisting of fabric, mesh, and plastic sheet.

11. A wind deflector component for a vehicle roof, comprising:
- a first arm that is rotatable about a first pivot axis and a second arm that is rotatable about a second pivot axis wherein the first and second arms extend transversely relative to guide rails that support a roof panel for movement between an open and closed position;
- first and second resilient members, each having a biasing force that biases the first and second arms, respectively, to rotate to one of a collapsed position and an upright position; and
- a first cam feature coupled to the first arm and having a first contact surface, and a second cam feature coupled to the second arm and having a second contact surface, wherein the first and second arms rotate about the first and second pivot axes, respectively, to the other of the collapsed position and the upright position when a force is applied against the first and second contact surfaces with the first and second arms being rotatable directly toward each other.

12. The wind deflector of claim 11 further comprising a web suspended between the first arm and the second arm.

13. The wind deflector of claim 12, wherein the web is made of a material selected from the group consisting of fabric, mesh, and plastic sheet.

14. The wind deflector of claim 11, wherein the first and second contact surfaces are curved.

15. A wind deflector for a vehicle roof, comprising:
- a first arm that is rotatable about a first pivot axis and a second arm that is rotatable about a second pivot axis;
- a web suspended between the first arm and the second arm;
- first and second resilient members, each providing a biasing force that biases the first and second arms, respectively, to rotate to one of a collapsed position and an upright position;
- a first cam feature coupled to the first arm and having a first contact surface, and a second cam feature coupled to the second arm and having a second contact surface; and
- first and second rams that are each movable to a position where the first ram pushes against the first contact surface and the second ram pushes against the second contact surface to rotate the first and second arms, respectively, about the first and second pivot axes to the other of the collapsed position and the upright position wherein the first and second pivot axes extend in a generally longitudinal direction and are laterally spaced apart from each other.

16. The system of claim 6 wherein the first and second arms extend transversely relative to the first and second guide rails.

17. A wind deflector for a vehicle roof, comprising:
- a first arm that is rotatable about a first pivot axis and a second arm that is rotatable about a second pivot axis, the first and second arms being pivotable between an upright position and a collapsed position;
- a web having a substantial portion extending along a lateral direction between the first arm and the second arm; and
- a resilient member providing a biasing force that biases the first and second arms to rotate about the first and second pivot axes to one of the collapsed position and the upright position wherein the first and second pivot axes extend in a generally longitudinal direction transverse to the lateral direction.

18. The wind deflector of claim 17 wherein the first and second arms pivot towards each other.

19. The wind deflector of claim 17 wherein the first and second arms are orientated to extend transversely to guide rails that support a roof cover for movement between open and closed positions.

* * * * *